Sept. 22, 1936. J. J. ITCZAK 2,055,218
FISH NET
Filed Aug. 21, 1935
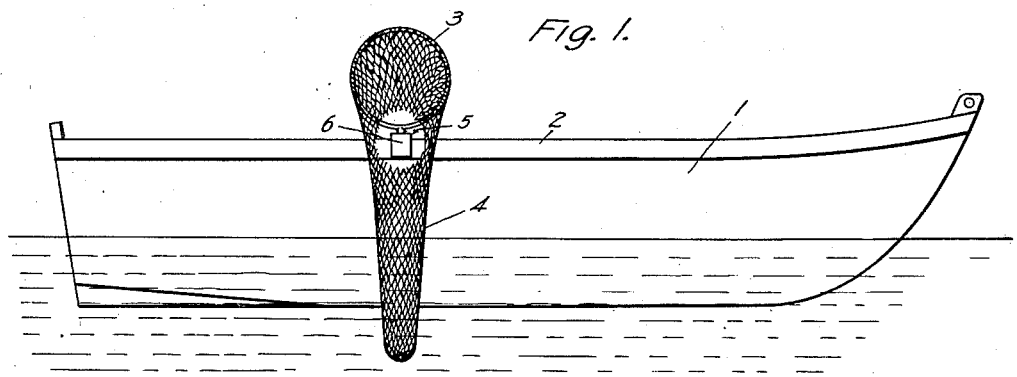
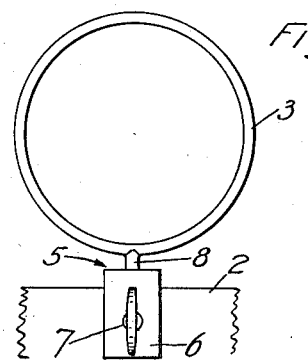
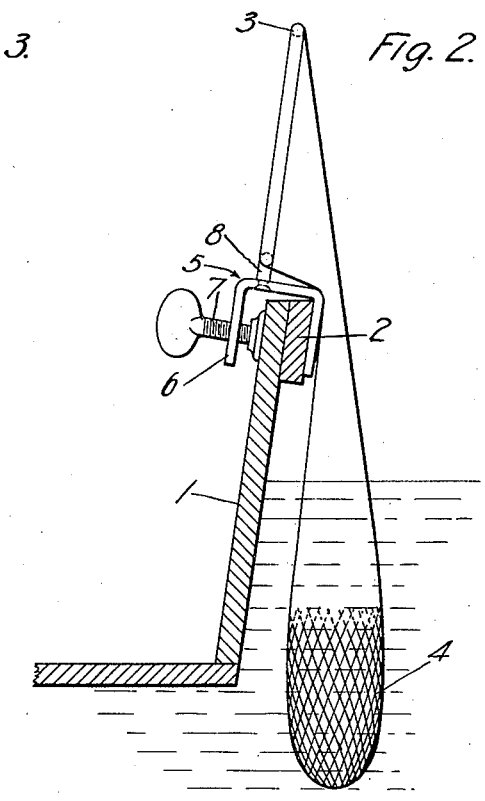
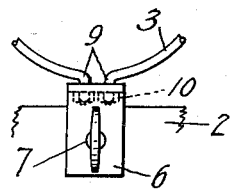
INVENTOR
Joseph J. Itczak
ATTORNEY Patented Sept. 22, 1936

2,055,218

UNITED STATES PATENT OFFICE 2,055,218

FISH NET

Joseph J. Itczak, Hartford, Conn.

Application August 21, 1935, Serial No. 37,192

5 Claims. (Cl. 43—55)

My invention relates to fish nets.

It has for its object to provide an improved fish net adapted for attachment to a boat and providing improved means for keeping the fish alive. A further object of my invention is to provide such a net having improved mounting means therefor whereby the net is so disposed that it is not only impossible for the fish to jump out of the net, but it is also easier to put the fish into the net, while the opening to the net is inside the boat in such manner as to avoid the possibility that the fish will fall into the water if dropped during the process of placing them into the net. A still further object of my invention is to provide an improved net disposed in an improved manner relative to the boat in such manner that danger of the net fouling on a dock or the like is eliminated, the net support and net instead being disposed in such an improved manner as not substantially to increase the width of the boat. These and other objects and advantages of my improved construction will, however, hereinafter more fully appear.

In the accompanying drawing, I have shown for purposes of illustration two embodiments of my invention.

In the drawing,—

Figure 1 is a side elevation of a boat equipped with my improved net, a portion of the latter being broken away to show the support;

Fig. 2 is an enlarged detail view of the net in position on the boat gunwale, a portion of the boat being shown in section, and the net being shown in outline at the top to facilitate illustration;

Fig. 3 is a detail view of the net ring and clamp, the net being omitted to facilitate illustration, and Fig. 4 is a detail sectional view of a modified form of net ring or hoop which may be used if desired.

In the illustrative construction shown in Figs. 1 to 3, I have shown my invention applied to a boat 1 and attached to the gunwale thereof, the same including a net together with a supporting ring or hoop therefor and attaching means whereby the hoop may be attached to the boat gunwhale with the hoop disposed in a wholly new relation to the gunwale in such manner as to enable markedly improved results to be obtained.

Referring more particularly to Figs. 1 and 2, it will be noted that the gunwale 2 of the boat carries a net ring or hoop 3 equipped with any usual net 4, with the member 3 disposed in substantially upright position above the gunwale 2. Thus it is possible for the net 4 to trail down at the side of the boat and extend to any desired depth into the water, while the net is substantially closed between its ends and the opening in the ring or hoop 3 is toward the boat and readily accessible from the latter. Herein it will also be noted that the ring or hoop 3 is suitably attached as by rivetting or welding to a suitable attaching bracket, indicated generally at 5, and herein including a U-shaped member 6 extending down at opposite sides of the gunwale and carrying on one arm thereof a transversely disposed threaded attaching screw 7 adapted to engage the inside of the gunwale and thus securely attach the clamp 5 and ring 3 to the boat while permitting ready removal whenever desired. As shown, a projection 8 on a closed ring or hoop 3 also projects into a corresponding aperture in the top of the member 6 and is suitably rivetted or welded thereto.

In Fig. 4 I have illustrated a modified form of ring and connection between the ring 3 and the clamp 5. In this construction, it will be noted that the ring 3 is of the spring or open type having adjacent laterally projecting spring ends 9 which are received in suitable corresponding apertures in the member 6 and are removably connected to the latter as by, for example, nuts 10 or the like. Here also it will be understood that, if desired, either type of ring may be either permanently attached to the clamping member 6 or removably attached in such manner as to maintain the ring or hoop 3 in the desired upright position or to permit removal of the same from the clamping member 6 while the latter remains attached to the gunwale.

As a result of my improved construction, it is made possible for the net 4 to close itself against the side of the boat above the fish in the bottom of the net and just below the bottom of the ring or hoop 3, the outer side of the net, by reason of the weight of the latter, tending to close over toward or engage the inner side of the portion of the net adjacent the side of the boat while that portion, in turn, engages the gunwale. Consequently it is practically impossible for a fish, no matter what the size of the net or the ring or hoop, to jump out of the net after being placed therein. Further, by reason of the disposition of the ring or hoop and the opening in the net above the boat gunwale, not only is the opening to the net more readily accessible to the fishermen, in such manner as to make it easier to put the fish into the net, but the chance of fish falling into the water if dropped during the process of putting the same in the net, is substantially eliminated, the fish instead being merely dropped or flopping into the boat. Attention is further directed to the substantial elimination of any necessity for the ring or hoop unduly increasing the width of the boat in such manner as to foul on a dock or the like, the upright disposition of the hoop bringing the same substantially within the lateral limits of the boat, while the tendency of the net to close on itself and against the side of the boat below the hoop previously described, further minimizes difficulty in this regard. It will also be observed that with the net thus closed, the fish which are in the bottom of the net and adjacent or below the bottom of the boat, are so disposed as to be free from injury should the gunwale of the boat be brought against a dock. These and other advantages of my improved construction will, however, be clearly apparent to those skilled in the art.

While I have in this application specifically described two embodiments which my invention may assume in practice, it will be understood that these forms of the same are shown for purposes of illustration, and that the invention is not limited thereto and may be modified and embodied in various other forms without departing from the spirit or the scope of the appended claims.

What I claim as new and desire to secure by Letters Patent is:

1. A fish holding net for boats or the like comprising a net support disposable on a boat gunwale and having a depending net, said support being so disposed that the net normally closes above the bottom and below the top of the net when the latter is in position on a boat.

2. A fish holding net for boats or the like comprising a net support disposable on a boat gunwale and having a depending net, said support having a ring or hoop above said support forming the mouth of the net and extending substantially upright from said support.

3. A fish holding net for boats or the like comprising net supporting and attaching means disposable on a boat gunwale, a net ring or hoop above said means supported in substantially upright position on said supporting and attaching means, and a net carried by said ring or hoop and trailing adjacent the boat below said ring or hoop and said means when the latter is carried on a gunwale.

4. A fish holding device comprising a net having a bag-like body with an open mouth, and means disposable on a boat for holding said body in pendent position alongside the boat with the mouth inwardly directed and at an elevation above that of the gunwale.

5. A fish holding device for boats comprising a net having a bag-like body with a ring at the mouth thereof, and means disposable on a boat gunwale holding said ring in upwardly projecting position over the gunwale.

JOSEPH J. ITCZAK.